United States Patent [19]

Makino et al.

[11] Patent Number: 5,266,878
[45] Date of Patent: Nov. 30, 1993

[54] CNC APPARATUS FOR CONTROLLING A PLURALITY OF MACHINES

[75] Inventors: Toshiyuki Makino, Kawasaki; Tuyoshi Yamaguchi, Hadano, both of Japan

[73] Assignee: Hitachi Seiko Ltd., Japan

[21] Appl. No.: 807,821

[22] PCT Filed: May 23, 1991

[86] PCT No.: PCT/JP91/00687

§ 371 Date: Jan. 23, 1992

§ 102(e) Date: Jan. 23, 1992

[87] PCT Pub. No.: WO91/18336

PCT Pub. Date: Nov. 28, 1991

[30] Foreign Application Priority Data

May 23, 1990 [JP] Japan .................................. 2-133573

[51] Int. Cl.$^5$ ...................... G05B 19/417; G05B 15/02
[52] U.S. Cl. .................................... 318/571; 318/572;
318/568.1; 364/474.01
[58] Field of Search ................................ 318/560-640;
364/474.01-474.29

[56] References Cited

U.S. PATENT DOCUMENTS

| | | | |
|---|---|---|---|
| 4,118,771 | 10/1978 | Pomella et al. | 364/474 |
| 4,415,965 | 11/1983 | Imazeki et al. | 364/474 |
| 4,519,026 | 5/1985 | Nozawa et al. | 318/562 |
| 4,530,046 | 7/1985 | Munekata et al. | 318/568 |
| 4,550,375 | 10/1985 | Sato et al. | 364/474 |
| 4,580,207 | 4/1986 | Arai et al. | 364/474 |
| 4,608,645 | 8/1986 | Niwa et al. | 318/572 |
| 4,787,049 | 11/1988 | Hirata et al. | 318/561 X |
| 4,882,670 | 11/1989 | Isobe et al. | 364/188 |
| 4,902,951 | 2/1990 | Ohta et al. | 318/632 |
| 4,956,785 | 9/1990 | Kawamura et al. | 364/474.01 |
| 4,965,500 | 10/1990 | Mizuno et al. | 318/568.13 |
| 5,005,134 | 4/1991 | Nakashima et al. | 318/674.01 |
| 5,057,755 | 10/1991 | Naka | 318/568.1 |

FOREIGN PATENT DOCUMENTS 57-127207  8/1982  Japan.
60-211507  10/1985  Japan.
1-161503  6/1989  Japan.

*Primary Examiner*—Paul Ip
*Attorney, Agent, or Firm*—Evenson, McKeown, Edwards & Lenahan

[57] ABSTRACT

A main CPU unit and a plurality of CNC units provided on a one-to-one correspondence with machine tools, and the main CPU unit is connected with an external storage device and an input device. To modify the mode of machine tool control or machining data of work, a new system program is down-loaded through the RAM of the main CPU unit into the CPU for the CNC unit, and according to this new system program, the part program including machining data normally stored in the CPU for the CNC unit.

7 Claims, 6 Drawing Sheets

CNC APPARATUS FOR CONTROLLING A PLURALITY OF MACHINES

TECHNICAL FIELD

This invention relates to a CNC (Computerized Numerical Control) apparatus for controlling a plurality of machine tools, and more particularly to a CNC apparatus for controlling a plurality of machine tools, which apparatus can be manufactured in a small size, make the plurality of machines operate at high speed, permit software to be rewritten easily, and has the maintainability of software improved substantially.

BACKGROUND ART

As described in JP-A-61-105616, for example, a conventional CNC apparatus for controlling a plurality of machines is arranged such that machine tools are connected on a one-to-one correspondence with CNC units, and that each CNC unit is connected to a host unit. Therefore, data is exchanged between the CNC units and the host unit (a cell controller and a program file unit) by serial transfer or via a LAN or the like. The CNC units and the host unit are each equipped with an operator input/output function.

The CNC apparatus in general incorporates a microcomputer, and therefore, software of several hundred kilobytes is used to operate the microcomputer. This software comprises a part program including machining data used in machining a workpiece with a machine tool, and a system program for controlling the motions of the machine tool by interpreting the part program in execution. The software is normally stored in ROM contained in each CNC unit, and cannot be modified easily.

For this reason, with a conventional CNC unit used for controlling a plurality of machine tools, when the system program and the part program need to be changed, the ROM has to be replaced. Another problem of the conventional CNC unit is that the CPU of the host unit and the respective CNC units are loosely coupled, and when changing the system program and the part program, it is necessary to exchange signals and transfer the programs between the CPU of the host unit and a CNC unit, and the host unit and the CNC unit must operate in a pair at all times. Therefore, the transfer speed of data including the system program and part program between the host unit and each CNC unit is relatively slow. When any one of the machine tools becomes unable to operate due to a fault in the system program or the part program, maintenance of the program for recovery to normal operation is complicated.

Therefore, the present invention has as its object to provide a general-purpose CNC apparatus for controlling a plurality of machines, which allows the system program and the part program to be changed easily and quickly, and which ensures the ease with which the system program or the part program can be maintained even when the program becomes not executable, and which can handle various kinds of machining operations.

DISCLOSURE OF INVENTION

In brief, a CNC apparatus for controlling a plurality of machines, comprises a main CPU unit including a RAM, a plurality of CNC units for driving and controlling the machines, an external storage device, connected to the main CPU unit, for storing system programs for controlling the machines, part programs and necessary data, a CRT for displaying the status of the CNC units connected to the main CPU unit, and input means, connected to the main CPU unit, for inputting operation commands to be passed between the CNC units and the main CPU unit, and in this CNC apparatus, the main CPU unit and the CNC units are connected in common connection by a bus line, and a RAM is shared by the main CPU unit and the CNC units.

The above-mentioned RAM is arranged to have a plurality of storage areas corresponding to the number of the CNC units.

The above-mentioned input means is so arranged to be able to input command signals to drive and control the plurality of CNC units concurrently.

Furthermore, the above-mentioned input means can be arranged to enter on a time series basis the command signals for controlling the plurality of CNC units to control different kinds of machines concurrently.

When the control contents of a CNC unit is to be changed, this can be done by down-loading a system program for the CNC unit to the RAM from the external storage device mentioned above.

In addition, the RAM is so arranged as to optionally store machining conditions and set conditions in the plurality of machines as a part of the part programs.

In the manner as described, the system of the main CPU unit and the CNC units are made ready for operation. When the system of the CNC units is set for operation, the system programs for controlling the machines are down-loaded from the external storage device through the RAM into the CPUs of the CNC units. When the main CPU unit and the CNC units become ready for operation, an optional CNC unit is selected by the input means. When that CNC unit is selected, the main CPU of the main CPU unit 1 is put into operation, causing a part program for controlling the machining operation on the machine is transferred from the external storage device and stored in the RAM of the main CPU unit 1.

The CPU of the CNC unit is put into operation, the CNC unit reads the part program stored in the RAM through the bus line, and controls the machine according to the system program so that the machine performs machining of the work according to the part program.

When a system program for concurrently controlling a plurality of CNC units is input from the input means, the plurality of CNC units are driven and controlled concurrently.

In addition, when part programs for controlling different kinds of machines are input on a time series basis from the input means, a plurality of CNC units operate concurrently, thereby driving the different kinds of machines concurrently.

When one wishes to preserve the current machining conditions and the set conditions of the machine in operation, he can store them in the RAM.

Software used in the present invention comprises a part program including machining data used when the work is cut by a machine, and a system program for controlling the motion of the machine by interpreting the part program being executed. At least the system programs which correspond to the CNC units are down-loaded from the external storage device through the RAM to the CNC units when the power supply for the whole CNC apparatus is turned on. At this time, the machining conditions and the set conditions of the part programs stored in the CNC units can be modified by the system programs. Therefore, for example, when the work is moved from a machine which is inoperable due to a malfunction of the system program or the part program to another machine to continue the same machining operation or when a certain machining operation is changed to another machining operation, a system program for that purpose is down-loaded from the external storage device to the machine concerned, and by this system program, the part program is modified. The system program can control the motion of the corresponding machine, while the part program can cause machining to be done according to new machining data.

As mentioned above, workpieces of the same kind can be machined on many machines at the same time. In addition, workpieces of difference kinds can be machined on many machined at the same time. Also, some of many machines can be operated.

Each CNC unit has only to be equipped with minimum number of peripheral devices, and the external storage device, input device and display unit can be shared by all the CNC units, so that the whole CNC apparatus can be simplified its configuration.

Since a RAM is included in the main CPU unit 1, data supplied due to changes in the system program or the part program is sent only in one direction to go from the RAM through the bus to the CNC units concerned, so that program changes can be carried out very quickly.

Incidentally, the above-mentioned machines for machining the work include machine tools, machines arranged in the assembly line, construction machines, etc.

As is clear from the foregoing description, the CNC apparatus for controlling a plurality of machines according to the present invention is sufficient in general-purpose serviceability to meet the machining specifications of various kinds of work.

BEST MODE OF CARRYING OUT THE INVENTION

Figure 1:
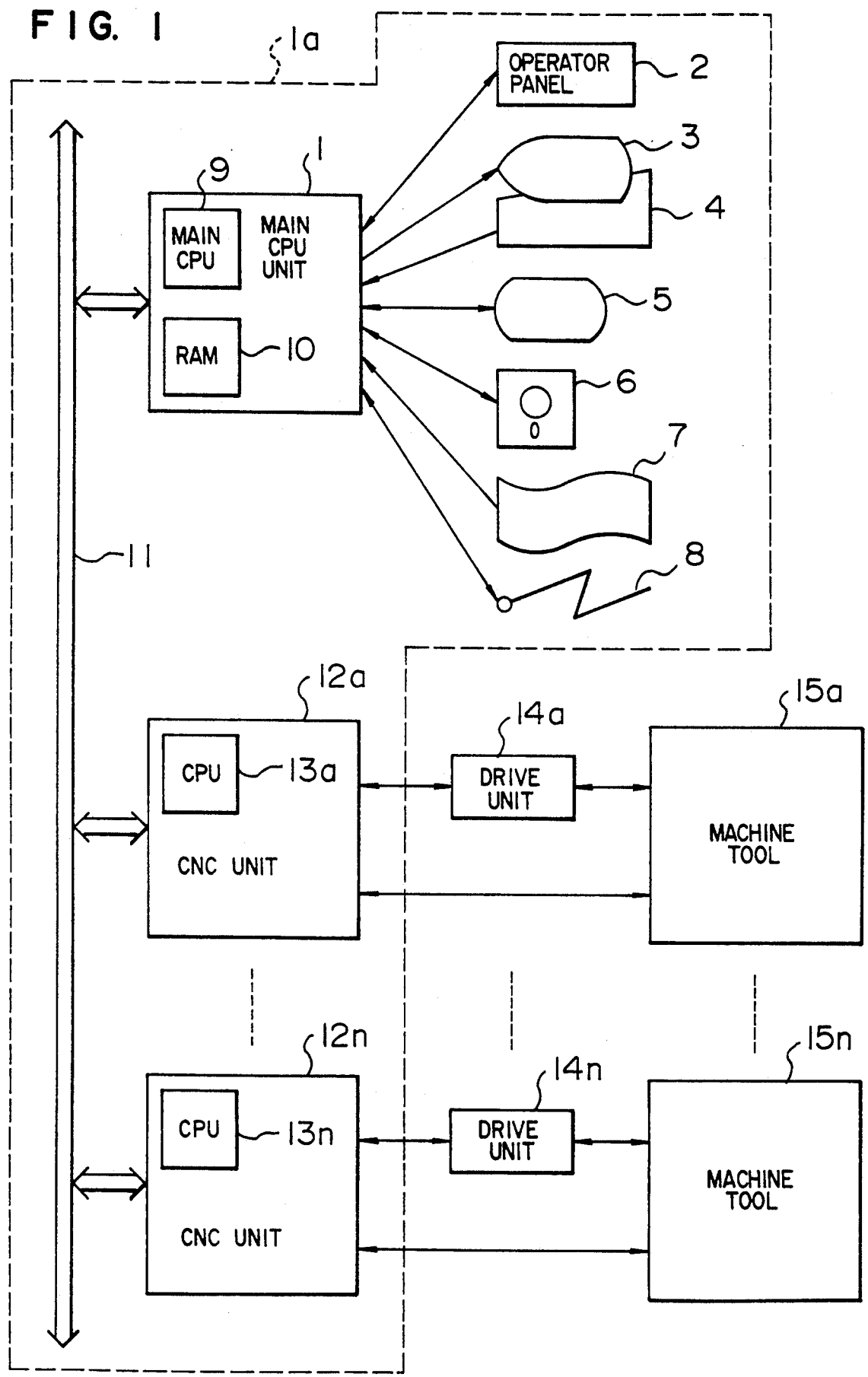
FIG. 1 is a block diagram showing an embodiment of a CNC apparatus for controlling a plurality of machines according to the present invention.

FIG. 1 shows a CNC apparatus 1a for controlling a plurality of machines according to the present invention.

In FIG. 1, reference numeral 1 denotes a main CPU unit, which is connected through a bus line 11 to CNC units 12a ... 12n.

Figure 2:
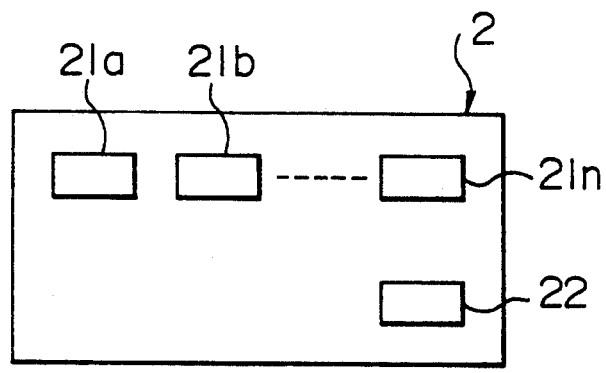
FIG. 2 is a front view of the operator panel.

Reference numeral 2 denotes an operator panel, which has thereon CNC selection buttons 21a, 21b ... 21n and a cycle start button 22 as shown in FIG. 2.

Reference numeral 3 denotes a CRT, which shows the status, machining conditions, set conditions, and part programs, etc. of the CNC units 12a ... 12n.

Reference numeral 4 denotes a keyboard, which is used to input manual data input (MDI) commands, etc.

Reference numeral 5 denotes a hard disk, which stores system programs and part programs, machining conditions, etc.

Reference numeral 6 denotes a floppy disk, which stores part programs.

Reference numeral 7 denotes a paper tape having punched holes representing a part program.

Reference numeral 8 denotes an interface, which is used for communication with a host unit (a personal computer, a host computer, for example), and which is more particularly a device made in compliance with the standard RS-232C stipulated in EIA.

An external storage device is formed by a host unit connected with the hard disk 5, floppy disk 6, paper take reader 7, and interface 8.

Input means is used to input operation commands to be passed between the CNC units and the main CPU unit 1, and is formed by the operator panel 2, the CRT 3, and the keyboard 4.

Reference numeral 9 denotes a main CPU, which controls input/output means including the operator panel 2, the CRT 3, the keyboard 4, hard disk 5, floppy disk 6, paper tape reader 7, and interface 8.

Reference numeral 10 denotes a RAM, which stores commands and data from the main CPU 9 and also stores commands and data from the CPUs 13a ... 13n of the CNC units 12a ... 12n connected to the RAM through the bus line 11. The RAM will be described in more detail later.

The bus line 11 can be used to form a multiprocessor structure, but cannot be used by the CPUs 13a ... 13n of the CNC units simultaneously. For example, this bus line 11 is in a form similar to Intel's multi-bus (IEEE-796).

The main CPU 9 and the RAM 10 are mounted on the main CPU unit 1.

The CNC units 12a ... 12n have mounted thereon CPUs 13a ... 13n for the CNC units, and are tightly-coupled with the main CPU unit 1 through the bus line 11. The CPUs 13a ... 13n of the CNC units control the CNC units 12a ... 12n.

Reference numerals 14a ... 14n denote drive units, which drive the motors of the corresponding machine tools 15a ... 15n by commands from the CNC units 12a ... 12n, and the machine tools 15a ... 15n are used to machine workpieces.

Figure 3:
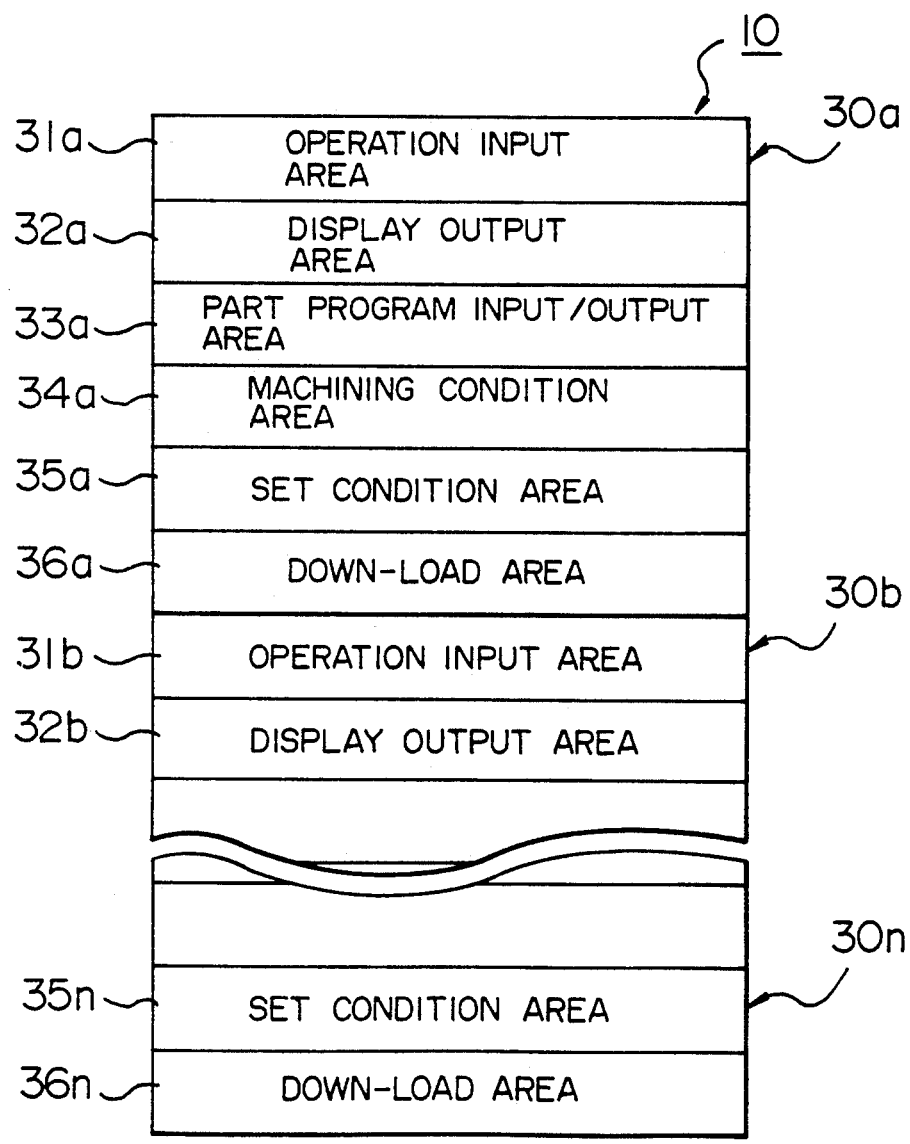
FIG. 3 is a diagram showing the contents of the RAM.

The internal structure of the RAM 10 is divided into CNC unit areas 30a ... 30n which correspond to the CNC units 12a ... 12n as shown in FIG. 3. Though the storage areas of the CNC unit areas 30a, 30b ... 30n of the CNC units 12a ... 12n do not have all reference codes attached in FIG. 3, if the reference codes are shown in continuous codes, they are display output areas 32a ... 32n, part program input/output areas 33a ... 33n, machining condition areas 34a ... 34n, set condition areas 35a ... 35n, and down-load areas 36a ... 36n for down-loading the system programs for the CNC units 12a ... 12n.

The operation input areas 31a ... 31n are storage areas for storing commands from the operator entered from the operator panel 2. Those operation input areas 31a ... 31n can be accessed from the CPUs 13a ... 13n of the CNC units.

The display output areas 32a ... 32n are storage areas for storing for display on the CRT 3 the part programs supplied from the hard disk 5, floppy disk 6, paper tape reader 7, and interface 8. Also, the display output areas 32a ... 32n are storage areas for storing the operating conditions of the machine tools 15a ... 15n, that is, the conditions of the CNC units 12a ... 12n at a given moment by the CPUs 13a ... 13n for the CNC units.

The part program input/output areas 33a ... 33n are storage areas for storing part program search commands from the CNC-unit-mounted CPUs 13a ... 13n (13a, for example) of the CNC units 12a ... 12n by a selection command signal of the CNC units 12a ... 12n (12a, for example) set by the main CPU 9. The part program input/output areas 33a ... 33n also serve as storage areas for storing the part programs of the machine tools currently engaged in machining.

The machining condition areas 34a ... 34n are storage areas for storing the machining conditions (the feed-table feed speed, the electric discharge machining voltage, for example) for use in machining the same kind of work next time.

The set condition areas 35a ... 35n are storage areas for storing the set conditions (label skip, for example) of the machine tool currently engaged in machining for use in machining the same kind of work next time.

The down-load areas 36a ... 36n are storage areas for temporarily storing system programs read from the external storage device (specifically, a hard disk 5) when setting ready for operation the CNC units 12a ... 12n (12a, for example) which do not have any system program stored inside.

Thus, the storage areas for the CNC units 12a ... 12n are divided into the operation input areas 31a ... 31n, the display output areas 32a ... 32n, the part program areas 33a ... 33n, the machining condition areas 34a ... 34n, the set condition areas 35a ... 35n, and the down-load areas 36a ... 36n.

When system programs are down-loaded into the corresponding CNC units 12a ... 12n, they are stored temporarily in the down-load areas 36a ... 36n, and then transferred to the CNC-unit-mounted CPUs 13a ... 13n of the CNC units 12a ... 12n. When part programs are down-loaded into the corresponding CNC units 12a ... 12n, they are stored temporarily in the part program input/output areas 33a ... 33n, and then transferred to the respective CNC-unit-mounted CPUs 13a ... 13n.

An embodiment of the present invention will now be described with reference to the flowcharts of FIGS. 4 and 5.

Power is supplied to the main CPU unit 1 and the CNC units 12a ... 12n connected to the main CPU unit 1 through the bus line 11 to make the system ready for operation.

Figure 4:
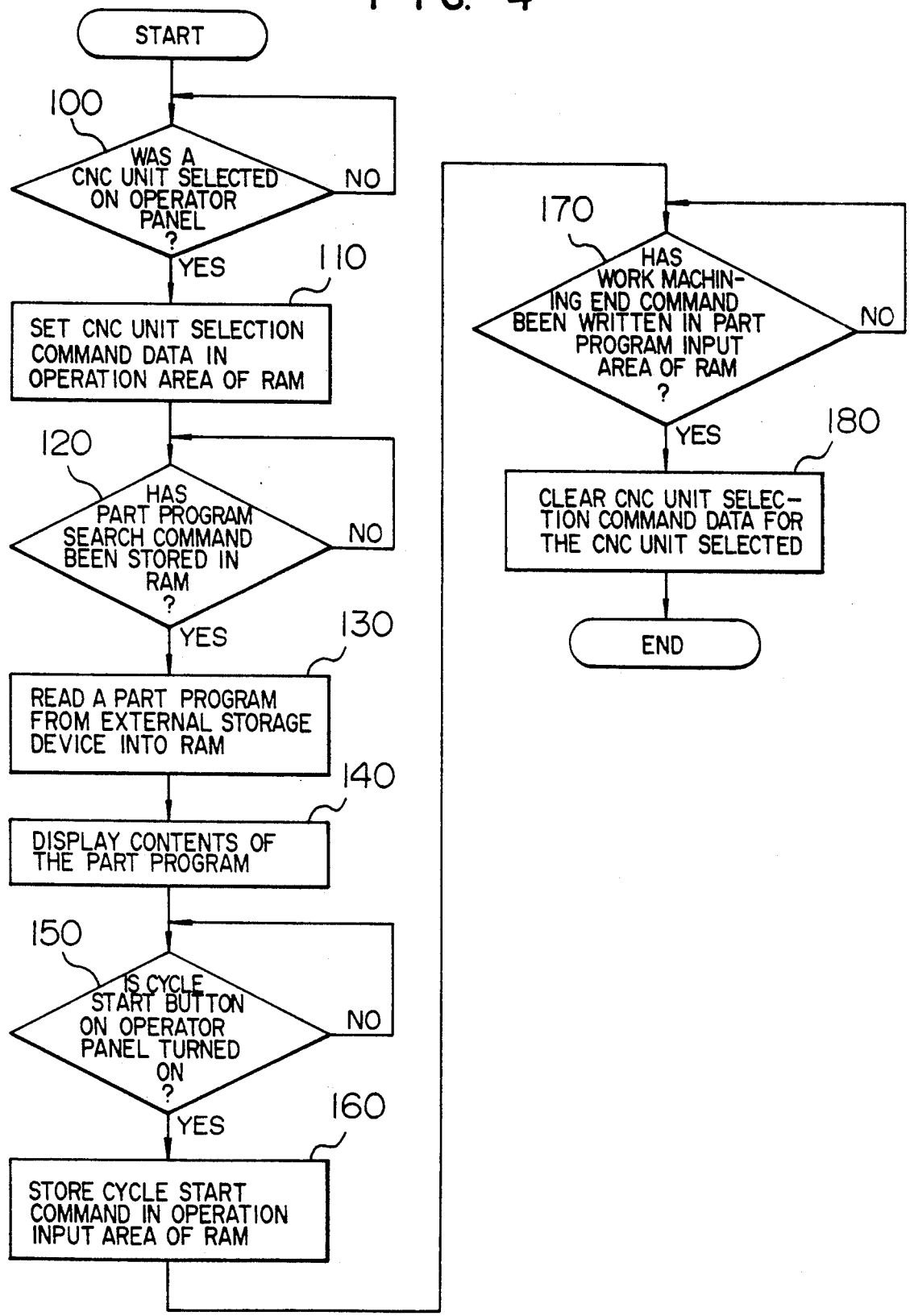
FIG. 4 is a flowchart showing the operation of the main CPU.

The main CPU 9 starts to operate according to the flowchart in FIG. 4. FIGS. 4 and 5 are flowcharts for changing the machining data included in a part program. At step 100, the operator manipulates the CNC selection buttons 21a ... 21n on the operator panel 2, and decision is made which of the CNC units 12a ... 12n is to be controlled. At this step 100, decision is made repeatedly until some of the CNC units 12a ... 12n is selected. When the operator selects and pushes any of the CNC units 21a ... 21n (to select 12a, for example) on the operator panel 2, some CNC unit (12a, for example) is selected, and this procedure moves on to step 110. At step 110, the main CPU 9 stores a command data for selecting the CNC unit 12a in the RAM 10. When the command data for selecting the CNC unit 12a is stored in the operation input area 31a of the RAM 10, the main CPU 9 at step 120 decides whether a part program search command for driving the machine tool 15a has been transferred by the CNC-unit-mounted CPU 13a from the CNC unit 12a to the part program input/output area 33a of the RAM 10.

Figure 5:
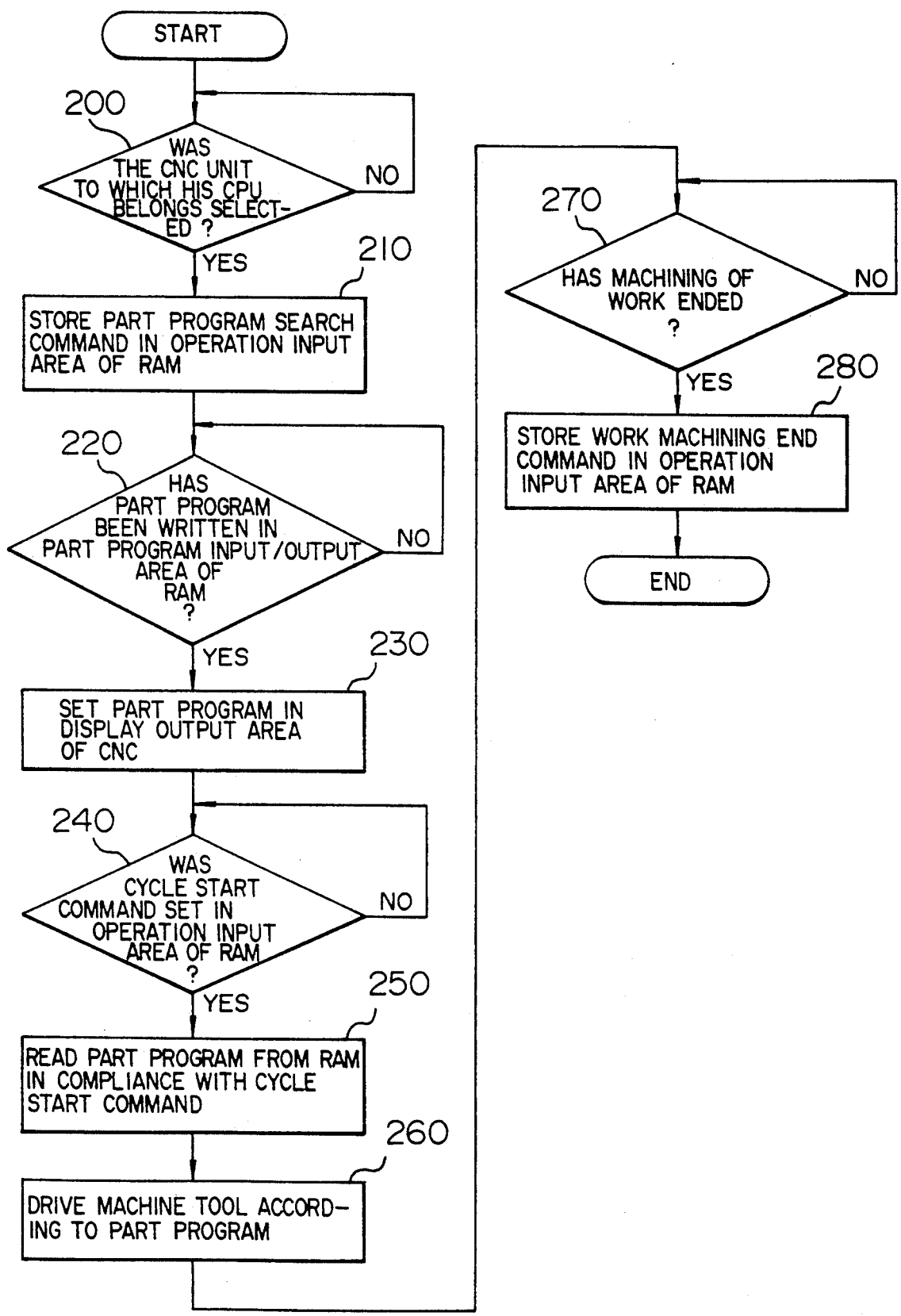
FIG. 5 is a flowchart showing the operation of the CPU for a CPU unit.

On the other hand, when the command data for selecting the CNC unit 12a is stored in the operation input area 31a at step 110, the CNC-unit-mounted CPU 13a of the CNC unit 12a, which has been monitoring the operation input area 31a at fixed time intervals, starts to operate according to the flowchart in FIG. 5. To be more specific, as shown in FIG. 5, at step 200, the CNC-unit-mounted CPU 13a reads the command data for selecting the CNC unit 12a stored in the operation input area 31a of the RAM 10 and determines that the CNC unit 12a to which the CPU 13a belongs has been selected. Then, at step 210, the CNC-unit-mounted CPU 13a transfers a part program search command for driving the machine tool 15a from the CNC unit 12a to the part program input/output area 33a of the RAM 10.

When the part program search command is stored in the part program input/output area 33a, the operation returns to the procedure of FIG. 4, that is, at step 120, the main CPU 9 confirms the presence of the part program search command, and at step 130, in compliance with the part program search command, the main CPU 9 reads the part program from the external storage device (hard disk 5, floppy disk 6, paper tape reader 7, or interface 8), and stores the part program in the part program input/output area 33a of the RAM 10. After the part program has been written in the part program area 33a, at step 140, the contents of the part program stored in the display output area 32a are shown on the CRT 3.

At the next step 150, a decision is made whether or not a cycle start button 22 on the operator panel 2 has been turned on. This cycle start button is a button which the operator manipulates to start reading the part program into the CNC unit 12a. When a decision is made at step 150 that the cycle start button 22 has been turned on, at step 160 a cycle start command is stored in the operation input area 31a of the RAM 10.

When the cycle start command has been stored in the operation input area 31a by the main CPU 9, the operation moves on to the procedure in FIG. 5, and at step 220 the CNC-unit-mounted CPU 13a decides whether or not the cycle start command has been stored. If a decision is made at step 220 that the part program has been written in the part program input/output area 33a of the RAM 10, at step 230 the part program is stored in the display output area 32a of the RAM 10.

At step 240, a decision is made whether or not the cycle start command has been input by the cycle start button. If it is confirmed at step 240 that the cycle start command has been input, at step 250, in compliance with the cycle start command input with the cycle start button 22, the CNC-unit-mounted CPU 13a reads the part program. At step 260, the CPU 13a drives the drive unit 14a for driving a motor to operate the machine tool 15a, by which the work is machined.

At step 270, a decision is made whether or not the machining operation has ended, and if the decision is that the machining operation has ended, the CPU 13a at step 280 stores a work machining end command in the operation input area 31a of the RAM 10. By this, the operation of the CNC-unit-mounted CPU 13a according to the flowchart of FIG. 5 is finished.

As the work machining end command is stored in the RAM, the operation returns to the procedure in FIG. 4, that is, the main CPU 9 at step 170 confirms the presence of the work machining end command, at step 180 clears the command data for selecting the CNC unit 12a stored in the operation input area 31a of the RAM 10, by which the operation of the main CPU 9 according to the flowchart in FIG. 4 is finished.

In this flowchart, the flow of control of the CNC unit 12a is shown for convenience of description. In fact, the software of the main CPU 9 adopts a multi-task structure for the individual CNC units 12a . . . 12n, so that the operation can be started with any of the CNC units 12a . . . 12n.

Furthermore, the CRT 3 is so arranged as to show the current condition of the selected one of the CNC-unit-mounted CPUs 13a . . . 13n, which will change moment by moment.

When the machine tools 15a . . . 15n connected to the CNC units 12a . . . 12n are all of the same kind, e.g., boring machines, by simultaneously selecting the CNC-unit-mounted CPUs 13a . . . 13n of the CNC units 12a . . . 12n, the CNC unit areas 30a . . . 30n corresponding to the CNC units 12a . . . 12n can be made to perform the same operation.

When the machine tools 15a . . . 15n connected to the CNC units 12a . . . 12n are of different kinds, e.g., die-sinking electric discharge machines and wire-cut electric discharge machines, they can be operated in the same manner as described above. The part programs to be read in this case must be those for the individual machine tools.

System programs are down-loaded by using the down-load areas 36a . . . 36n when power is supplied to the system. The system programs to down-load can be selected either by the main CPU 9 or the CNC units 12a . . . 12n.

Figure 6:
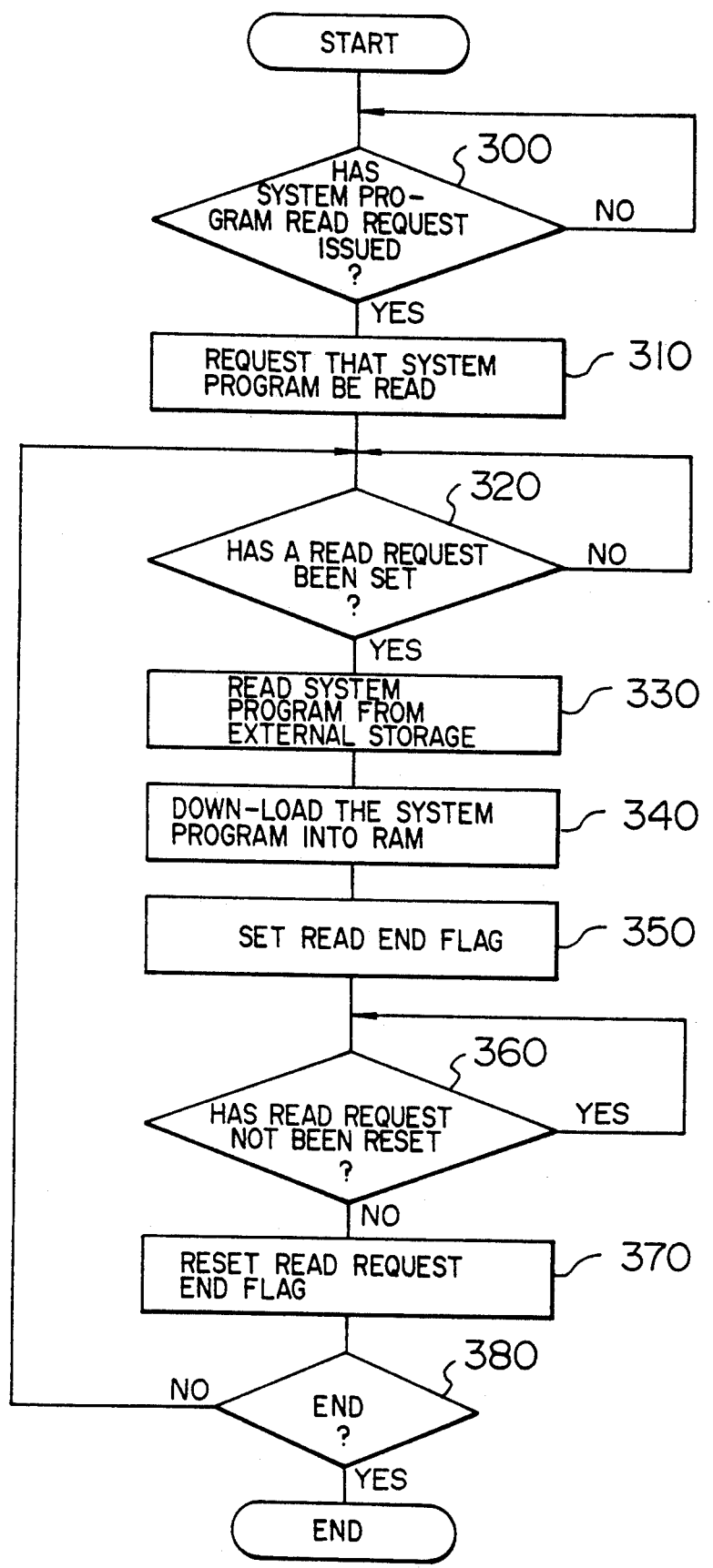
FIGS. 6 and 7 are flowcharts showing the operation of a system program is down-loaded to a CNC unit.
Figure 7:
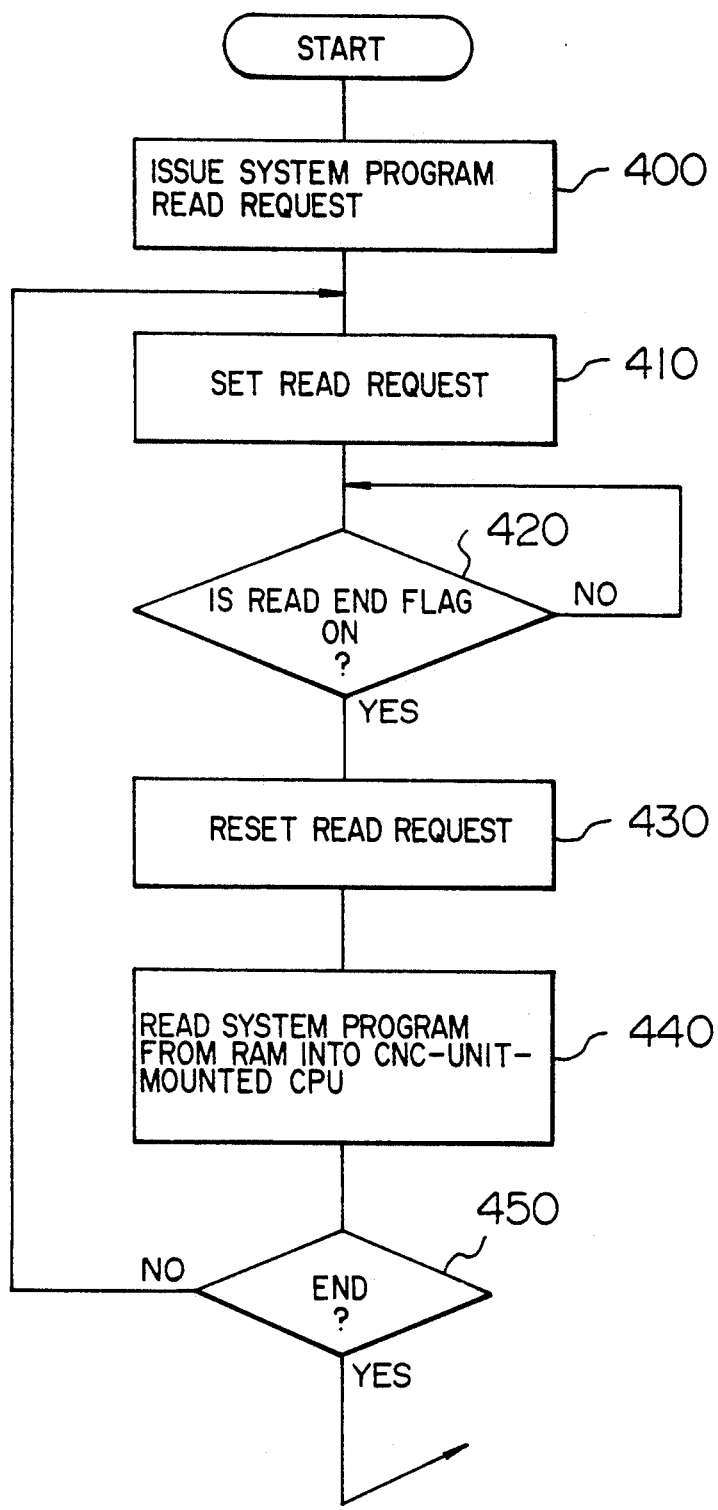

The modification of the system program will then be described with reference to the flowcharts of FIGS. 6 and 7. The flowchart in FIG. 6 shows the operation of the main CPU 9. While the flowchart in FIG. 7 shows the operation of any of the CNC-unit-mounted CPUs 13a . . . 13n. Both flowcharts of FIGS. 6 and 7 show the operations which occur basically in the same way as shown in the flowcharts of FIGS. 4 and 5.

At step 300, the main CPU unit decides whether or not a system program modification request has been issued by the input means. If the decision is YES, the main CPU at step 310 requests that a modified system program should be read.

If at step 300 the modification request is found to have been issued, some of the CNC-unit-mounted CPUs 13a . . . 13n starts to operate according to the flowchart in FIG. 7. Specifically, at step 400 a system program read request is issued, and at step 410, the read request is set. The operation now returns to the steps in FIG. 6. At step 320, a decision is made whether or not a read request has been set, and if the read request has been set, at step 330 a system program is read from the external storage device. At step 340, the system program is down-loaded in any of the down-load areas 36a . . . 36n of the RAM 10. At step 350, a read end flag is set. When the read end flag is set, at step 420 of FIG. 7, a decision is made whether or not the read end flag is on, and if the read end flag is on, at step 430 the read request is reset. So, the decision at step 360 of FIG. 6 is that the read request has been reset, and therefore, the read end flag is reset at step 370. At step 380, a decision is made whether or not the reading of the system program has ended, and if the decision is yes, the reading of the system program is completed.

On the other hand, at step 440 of FIG. 7, the system program stored in one of the down-load areas 36a . . . 36n of the RAM 10 is read into the corresponding one of the CNC-unit-mounted CPUs 13a . . . 13n. At step 450, a decision is made whether or not the reading into the corresponding one of the CNC-unit-mounted CPUs 13a . . . 13n has ended. If the reading has ended, the system program read in the above-mentioned one of the CNC-unit-mounted CPUs 13a . . . 13n is executed, so that the part program already input in that one of the CNC-unit-mounted CPUs 13a . . . 13n is modified, more specifically, the machining data including the machining conditions and the set conditions are modified. Thus, the machine tools 15a . . . 15n are operated according to the modified programs, and workpieces are machined according to machining data of the modified part programs.

The functions of the system program include to control the machining data, that is, the machining conditions and the set conditions in the part program, to control the operation of the machine tools 15a . . . 15n, and to show the condition of the machine tools which are performing machining. The part program includes data on movement in the X-, Y- and Z-directions and temperature data for heating and cooling.

Though not shown as an embodiment, each machine may be provided with an operator panel if necessary, and the machines may be controlled from the operator panels connected to the CNC units 12a . . . 12n without being controlled by the main CPU 9.

As the machining condition areas 34a . . . 34n and the set condition areas 35a . . . 35n are provided in the CNC unit areas 30a . . . 30n in the RAM 10, it is possible to make arrangement such that the main CPU 9 moves the contents of the machining condition areas 34a . . . 34n and the set condition areas 35a . . . 35n of a CNC unit area to the corresponding areas of another CNC unit area, or transfer those contents to the external storage device, or read the contents of some of the machining condition areas 34a . . . 34n or the set condition areas 35a . . . 35n and store them in the corresponding areas in optional ones of the CNC unit areas 30a . . . 30n.

Moreover, for the bus line in this embodiment, Intel's multi-bus may be used which is so arranged as to directly transfer data between the memory units included in the CPUs 13a . . . 13n mounted in the CNC units.

INDUSTRIAL APPLICABILITY

This invention is used when operating a plurality of machine tools arranged in the process to machine mechanical and electrical parts. The CNC apparatus according to the present invention is suitable for machining parts to different specifications on many machine tools by software programs which can arbitrarily change the operation of the machine tools, and will contribute to improvement of productivity in the automobile industry, the heavy machine industry and the electric machine industry.

We claim:

1. A CNC apparatus for controlling a plurality of machines, comprising a main CPU unit including a RAM and an external storage device for storing at least a system program, part program and data; input means for entering operation commands to said main CPU unit; and a plurality of CNC units operatively connected to a bus commonly shared with said main CPU unit, wherein one of the operation commands is a command to the main CPU unit to select at least one of the CNC units for controlling an associated one of the machines, the main CPU unit is configured to determine transfer of a part program search command from the selected at least one of the CNC units, to read the part program from the external storage device and to store the part program in the RAM and the selected at least one of the CNC units, and the bus is configured for parallel data transmission to transfer the system program which has been transferred from the external storage device into the main CPU unit to the selected at least one of the CNC units and via a flag to modify the part program in the selected at least one of the CNC units.

2. A CNC apparatus for controlling a plurality of machines according to claim 1, wherein said RAM has a plurality of separate storage areas corresponding to the number of said CNC units.

3. A CNC apparatus for controlling a plurality of CNC units according to claim 1, wherein said input means is configured to input command signals for controlling a plurality of CNC units concurrently.

4. A CNC apparatus for controlling a plurality of CNC units according to claim 1, wherein said input means is configured to input on a time series basis command signals for concurrently controlling a plurality of CNC units to control different kinds of machines.

5. A CNC apparatus for controlling a plurality of machines according to claim 1, wherein the apparatus is configured to down-load the system program for a CNC unit into said RAM, and according to said system program, to modify the part program for machining of a workpiece.

6. A CNC apparatus for controlling a plurality of machines according to claim 5, wherein the apparatus is configured to store part programs for machining data for the machines corresponding to the plurality of CNC units arbitrarily in said RAM.

7. A CNC apparatus according to claim 5, wherein the apparatus is configured to down-load said system programs from said external storage device into said CNC-unit-mounted CPUs, and, according to said system programs, to modify the machining data in the part programs stored in said CNC-unit-mounted CPUs.

* * * * *